June 19, 1962 C. A. JOHNSON 3,039,332
WORK SECURING AND LOCATING DEVICE
Filed July 6, 1960 2 Sheets-Sheet 1
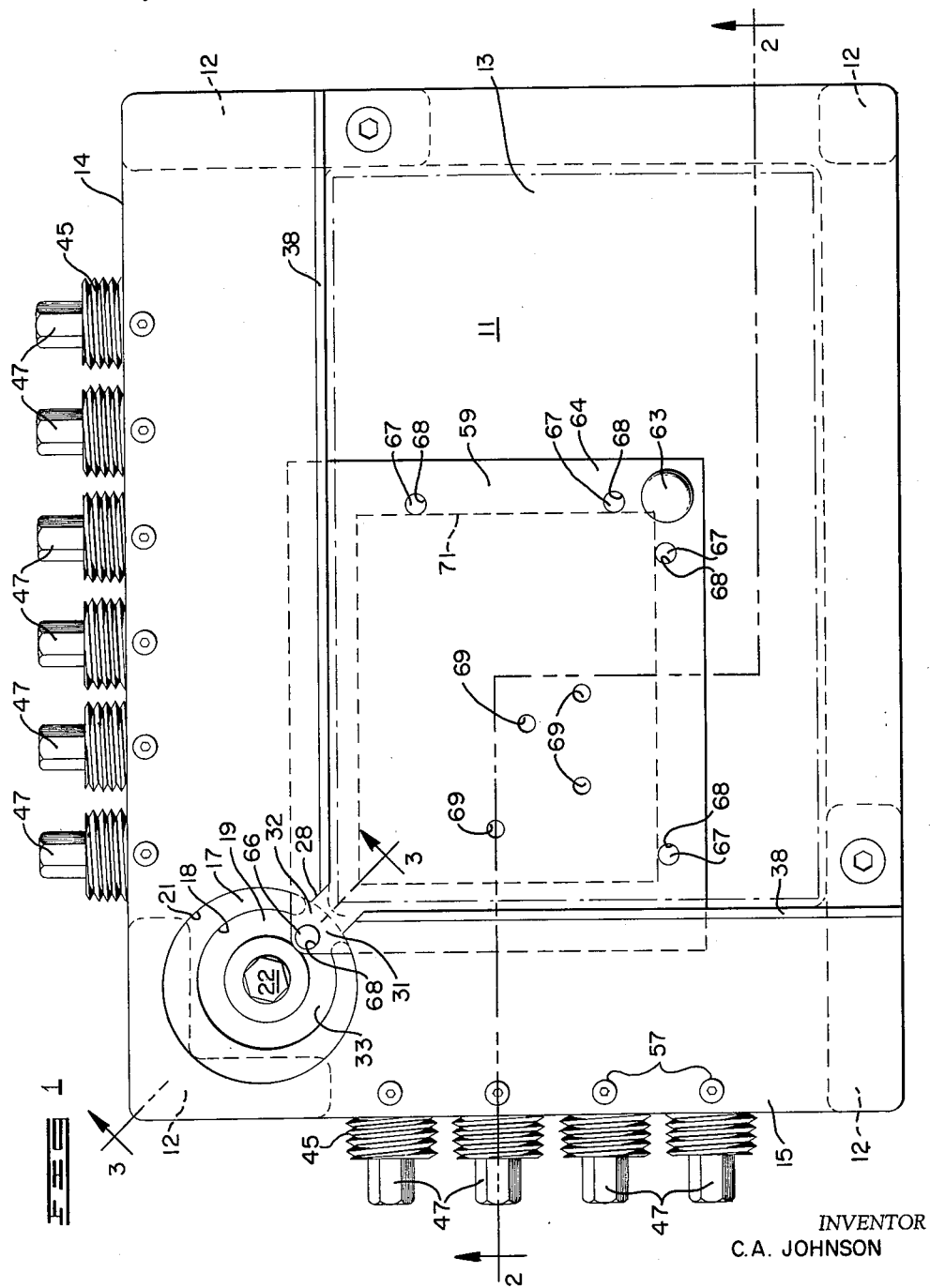
INVENTOR
C.A. JOHNSON
BY R.P. Miller
ATTORNEY June 19, 1962    C. A. JOHNSON    3,039,332
WORK SECURING AND LOCATING DEVICE
Filed July 6, 1960    2 Sheets-Sheet 2
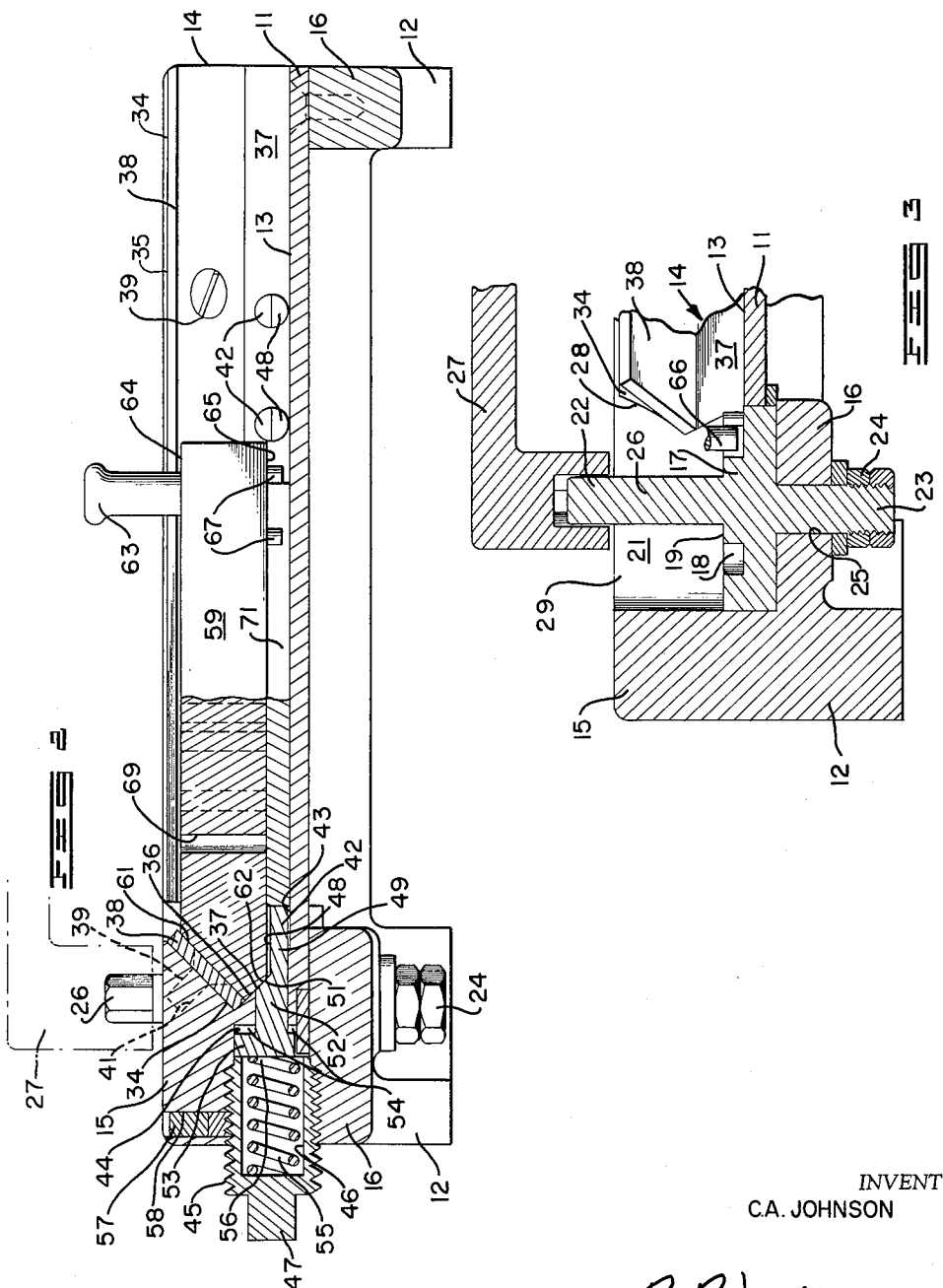
INVENTOR
C.A. JOHNSON
BY R. P. Miller
ATTORNEY

United States Patent Office

3,039,332
Patented June 19, 1962

3,039,332
WORK SECURING AND LOCATING DEVICE
Clair A. Johnson, Dallas, Tex., assignor to Western Electric Company, Incorporated, a corporation of New York
Filed July 6, 1960, Ser. No. 41,067
6 Claims. (Cl. 77—62)

This invention relates to a work securing and locating device and more particularly to a work securing and locating device for rapid and accurate positioning of parts serially with respect to a machine for performance of a repetitive work operation thereon.

In replica work operations, such as drilling, it is desirable to orient succeeding pieces of work absolutely with respect to a drill in order to achieve uniformity of drilled products. To this end many fixtures and jigs have been devised; however, to accomplish correct orientation of successive workpieces and to obtain positive locking of an oriented workpiece with respect to a tool, known devices are complicated in structure and difficult to manufacture. Both positive orientation and locking of a workpiece is gained by the present invention which is made of a few, easily manufactured parts.

An object of the present invention is the provision of a new and improved work securing and locating device.

Another object is to provide a work securing and locating device for securely locking a part in location for the working of the part.

A further object of the invention is the provision of a work securing and locating device having a part-engaging template readily locked in a position whereat the work is located securely and accurately with respect to an apparatus for performance of a work operation thereon.

Still another object is to provide a work securing and locating device having a part-engaging template movable into and out of a position by the operation of a cam such that a plurality of parts are located serially in the desired position by repetitive operation of the cam.

A work securing and locating device illustrating certain aspect of the invention may include a base plate having upstanding sides extending therefrom, and a work-engaging template slidably supported on the plate. A cam with a groove on its face and with a guideway communicating the cam groove with the surface of the plate is located in a recess provided at the intersection of two sides of the base plate, and a follower pin fixed to the template is received within the guideway and the groove whereupon the cam is rotated to draw the template into locked position against the sides of the device.

A complete understanding of the invention may be had from the following detailed description of a specific embodiment thereof when read in conjunction with the appended drawings, wherein:

FIG. 1 illustrates a top plan of a preferred embodiment of the invention with a template positioned for locking in place on the surface of a base plate;

FIG. 2 shows a section of the device taken on the line 2—2 of FIG. 1 looking in the direction of the arrows and depicting bevelled sides of the device in frictional engagement with the matching bevelled walls of the template; and FIG. 3 is a sectional view of a portion of the device taken on the line 3—3 of FIG. 1 looking in the direction of the arrows and showing a cam having an eccentric shaft with a surface cam groove in communication with the base plate via a guideway slotted in the cam.

Referring to the drawings, wherein like reference characters designate like or corresponding parts throughout the several views, there is shown in FIG. 1 a base plate 11 mounted upon legs 12. Extending upwardly from the marginal portion of the surface 13 of the base plate are intersecting sides 14 and 15 which are supported by a frame 16, FIG. 2, underlying the plate 11 such that the plate is sandwiched fixedly, by suitable means such as welding or the like, between the sides 14 and 15 and the frame 16, respectively.

A cam 17 having a groove 18 on its face 19 is disposed in a recess 21 machined into the sides 14 and 15 at their intersection. As best shown in FIG. 3, the cam 17 has an eccentric shaft 22, the lower portion 23 of which is mounted by fasteners such as nuts 24 for rotation in an aperture 25 passed through the frame 16.

The upper portion 26 of the cam shaft 22, to which the handle 27 is fixed, is located centrally with respect to the annular cam groove 18, but both the upper shaft portion 26 and the cam groove 18 are eccentric with the periphery of the cam 17. The recess 21, FIG. 3, into which the cam 17 is seated with precision, communicates with the surface 13 of the plate 11 by provision of a vertically extending slot 28 through the wall 29 of the intersecting sides 14 and 15 which form a right angle corner of this embodiment of the invention.

A guideway 31 is provided on the cam face 19 to connect the groove 18 of the cam 17 with the surface 13 of the base plate 11. The guideway 31 is designed with a depth which forms a shelf 32 lying in the plane of the bottom 33 of the groove 18. Further, the base plate 11 is fixed on the frame 16 with the surface 13 of the plate in the plane which includes the bottom 33 of the cam groove 18 and the shelf 32 of the guideway 31.

Referring to FIG. 2, the sides 14 and 15 of the device are shaped to form a bevel 34 directed inwardly and downwardly into the walls 35 and 36 of the sides 14 and 15. The slope of the bevel 34 is reversed to an outward direction along a line in a plane vertically spaced above the surface 13 of the base plate 11 such that a right angle is defined by the bevel 34 and an incline 37 formed by the reversal of the slope of the bevel 34. The incline 37 terminates on the surface of the base plate 11, FIG. 3. A wear plate 38 is fixed to the bevel 34 by threaded fasteners 39 receivable into tapped bores 41.

A plurality of biasing pins 42 are received slidably through passages 43 formed laterally through the sides 14 and 15 at spaced intervals. The passages 43 are provided with countersinks 44, the walls of which are threaded for a portion of their lengths to engage externally threaded walled closures 45 having hollow interiors 46. Axially aligned with closures 45 are protuberances 47, for turning by a tool such as a wrench, formed integral with the closure 45. The lowermost surfaces of the passages 43 lie in a plane which includes the surface 13 of the base plate 11 such that the pin 42 slides along the surface 13 when assembled in the passages 43.

Each pin 42 is machined to form a flat 48 which extends for a portion of the pin length, FIG. 2. The flat 48 defines a semi-circular cross-sectional portion 49 of the pin which protrudes through the passage 43 onto the surface 13 of the base plate 11. A sloping pin section 51 joins the portion 49 of the pin 42 with a round cross-sectional portion 52, and the sloping section 51 lies in the plane of the incline 37 of the sides 14 and 15 when the pin 42 protrudes its maximum extent over the surface 13 of the base plate 11.

A head 53 is fashioned on the extremity of the round cross-sectional portion 52 of the pin 42, and bottoms against shoulders 54 of the countersink 44 in assembled condition. A compression spring 55 is positioned within the countersink 44 and the hollow interior 46 of the closure 45, and the compression of the spring 55 is adjusted by varying the distance the closure 45 is threaded into the countersink 44. The inner convolution 56 of the compression spring 55 bears against the head 53 of the pin 42 and the pin is thereby biased inwardly by the compressive force of the spring 55. A set screw 57 for locking the closure 45 in position is received threadedly within an opening 58 passing through the top of the sides 14 and 15, and in communication with the threaded countersink 44.

In FIGS. 1 and 2 there is shown a template 59 having sloping edges 61 and 62 conforming in configuration to the bevel 34 and incline 37 of the sides 14 and 15. A rod 63 is fastened to the top surface 64 of the template 59 at one corner thereof. In the diagonally opposite corner of the template 59 from the rod 63 and depending vertically from the lower surface 65 of the template is a follower pin 66. Also depending from the lower surface 65 of the template 59 are suitably positioned locator pins 67. The locator pins 67 and the follower pin 66 are adjustable in length by the extent to which they are threaded into tapped openings 68 passing through the template 59. Guide apertures 69 are drilled, for example, through the template 59 in a pattern desired to be duplicated on a work 71.

In operation of the device an operator first places the work 71 on the surface 13 of the base plate 11. The template 59 is superimposed on the work 71 and oriented such that the follower pin 66 is adjacent the guideway 31, and the locator pins 67 overhang the edges of the work. The rod 63 of the template 59 is grasped by the operator and the template 59 is thrust toward the cam 17. The semi-circular cross-sectional portions 49 of the biasing pins 42 contact the work 71 but not the template 59 to resist the movement of the work 71 as it is slid on the surface 13 of the base plate 11. The work 71 is forced into firm frictional contact with the locator pins 67 by the resistance offered by the biasing pins 42 to position accurately the work under the template 59 for locking by the cam 17.

At the time the work 71 is biased firmly into position against the locator pins 67, the follower pin 66 has passed through the guideway 31 into the cam groove 18. The operator, without releasing his grasp on the rod 63 and his force thereon, turns the handle 27 of the cam shaft 22 to rotate the cam 17 within the recess 21. The follower pin 66 then is pulled by the rotated wall of the groove 18 on the face 19 of the cam 17, thus drawing the template 59 cornerwise toward the cam until the sloping edges 61 of the template 59 frictionally abut the bevel wear plate 38. The operator can then remove his hand from the rod 63, and, while holding the cam handle 27 with the template 59 and work 71 in locked position, manipulate a tool, such as a drill, for performance of a work operation on the work 71.

It is obvious that the above-described embodiment of the invention is merely illustrative and that numerous modifications may be made within the spirit and scope of the invention.

What is claimed is:

1. A securing and locating device comprising support means for sustaining a workpiece, rotative cam means mounted on the support means, stop means fixed on the support means, template means located slidably on the support means for positioning a workpiece sustained on the support means, and cam follower means attached to the template means and engaged to the cam means such that rotation of the cam means forces the template means toward the cam means to a position whereat the template means is biased against the stop means and the workpiece is locked in position.

2. A securing and locating device comprising support means for sustaining a workpiece, rotative cam means mounted on the support means, stop means fixed on the support means, urging elements fastened to the stop means, template means located slidably on the support means for positioning a workpiece disposed thereunder on the support means, cam follower means attached to the template means and engaged to the cam means, and work locator pins dependingly attached to the template means for overhanging edges of a workpiece sustained on the support means, the urging elements contacting the edges of the workpiece opposite the edges which the locator pins overhang to hold yieldably the workpiece in position under the template means between the elements and pins, whereby rotation of the cam means pulls the template means toward the stop means to a position whereat the template means abuts the stop means.

3. A securing and locating device comprising a rectangular base plate, upstanding side members fixed to the plate and being joined at the corners of the rectangular plate, one juncture of the side members having a slot opening into a recess formed therein, a cam mounted for rotation within the recess, a workpiece positioning template slidably supported on the base plate, a cam follower attached dependingly to the template and engaged with the cam through the slot, and work locator pins attached dependingly to the template for overhanging the edges of a workpiece positioned under the template on the plate whereby rotation of the cam pulls the template toward the cam and the workpiece is drawn by the locator pins to a predetermined position on the plate.

4. A securing and locating device comprising a base plate, upstanding side members fixed to the marginal portions of the upper surface of the base plate and joined at one corner of the plate, the side member inner walls adjacent the central portion of the plate being bevelled, a template slidably positioned on the plate to overlie a workpiece and having bevelled edges of mating configuration with the bevels of the side member inner walls, the juncture of the side members having a recess formed therein and a slot communicating the recess with the central portion of the plate, a cam rotatively supported within the recess having a cam groove in the face thereof and a guideway connecting the groove with the central portion of the plate via the slot, a cam follower attached to the template and positioned within the cam groove, and locator pins fastened to the template positioned to overhang the edges of a workpiece placed beneath the template on the plate whereby rotation of the cam pulls the template in a direction toward the center of the cam with the locator pins urging the workpiece under the template in the same direction until the bevelled edges of the template abut the mating bevels of the side members.

5. A securing and locating device comprising a base plate, legs attached to the plate, upstanding side members fixed to the marginal portions of the upper surface of the base plate and joined at one corner of the plate, the side member inner walls adjacent the plate central portion being bevelled, spring-biased pins mounted to the side members and extending therethrough onto the surface of the plate central portion, a template slidably positioned on the plate central portion to overlie a workpiece, the template having bevelled edges of mating configuration with the bevels of the inner walls of the side members and apertures passing through the template at points where drilling of the underlying workpiece is desired, locator pins depending from the template to overhang the edges of the workpiece, a cam follower depending from the template at a position to overhang a workpiece, the spring-biased pins being in contact with the edges of a workpiece under the template whereby the workpiece is positioned yieldingly between the locator pins and the spring-biased pins, the juncture of the side members having a recess formed therein and a slot communicating the recess with the central portion of the plate, and a cam having a grooved face rotatively supported within the recess and having a guideway connecting the cam groove with the central portion of the plate, and the cam follower being engaged within the cam groove whereby rotation of the cam pulls the template toward the cam and the locator pins pull the workpiece against the bias of the spring-biased pins until the bevels of the template and the side members abut to secure the workpiece for drilling.

6. A securing and locating device which comprises a workpiece support, a template having a projection thereon, a driving means connected to the template for imparting motion thereto along a predetermined line, and a pair of sides projecting from the workpiece support and arranged at an angle to one another, one of the sides being on either side of the line, whereby actuation of the driving means clamps a workpiece between the projection and the sides.

References Cited in the file of this patent
UNITED STATES PATENTS
1,148,640     Wehner _____ Aug. 3, 1915